United States Patent
Patel et al.

[11] Patent Number: 5,972,444
[45] Date of Patent: *Oct. 26, 1999

[54] POLYOLEFIN COMPOSITIONS WITH BALANCED SHRINK PROPERTIES

[75] Inventors: Rajen M. Patel; Jacquelyn A. deGroot, both of Lake Jackson, Tex.

[73] Assignee: The Dow Chemical Company, Midland, Mich.

[*] Notice: This patent is subject to a terminal disclaimer.

[21] Appl. No.: 08/748,322

[22] Filed: Nov. 13, 1996

Related U.S. Application Data

[60] Continuation-in-part of application No. 08/428,273, Apr. 25, 1995, Pat. No. 5,632,510, which is a division of application No. 08/055,063, Apr. 28, 1993, Pat. No. 5,562,958, which is a continuation-in-part of application No. 07/916,269, Jul. 21, 1992, Pat. No. 5,296,175, and application No. 08/024,563, Mar. 1, 1993, abandoned, which is a continuation-in-part of application No. 07/776,130, Oct. 15, 1991, Pat. No. 5,272,376

[60] Provisional application No. 60/011,874, Feb. 20, 1996.

[51] Int. Cl.⁶ .............. B32B 7/02; B32B 27/08
[52] U.S. Cl. ............ 428/35.2; 428/36.9; 428/218; 428/349; 428/516; 525/240
[58] Field of Search .................. 525/240; 428/218, 428/349, 516, 35.2, 36.91

[56] References Cited

U.S. PATENT DOCUMENTS

| | | | |
|---|---|---|---|
| 4,820,557 | 4/1989 | Warren | 428/34.9 |
| 4,952,451 | 8/1990 | Mueller | 428/218 |
| 5,272,236 | 12/1993 | Lai et al. | 526/348.5 |
| 5,278,272 | 1/1994 | Lai et al. | 526/348.5 |
| 5,397,613 | 3/1995 | Georgelos | 428/36.7 |
| 5,397,640 | 3/1995 | Georgelos et al. | 428/349 |
| 5,451,450 | 9/1995 | Erderly et al. | 428/333 |
| 5,460,861 | 10/1995 | Vicik et al. | 428/34.9 |
| 5,562,958 | 10/1996 | Walton et al. | 428/34.9 |
| 5,593,747 | 1/1997 | Georgelos | 428/35.9 |
| 5,604,043 | 2/1997 | Ahlgren | 428/518 |
| 5,629,059 | 5/1997 | Desai et al. | 428/36.6 |
| 5,677,383 | 10/1997 | Chum et al. | 525/240 |

FOREIGN PATENT DOCUMENTS

| | | | |
|---|---|---|---|
| 0 436 196 A2 | 7/1991 | European Pat. Off. | C08L 23/04 |
| 0 572 034 A2 | 3/1993 | European Pat. Off. | C08F 210/02 |
| 0 737 713 A1 | 9/1996 | European Pat. Off. | C08L 23/16 |
| 94/25523 | 6/1994 | WIPO | C08L 23/16 |
| 95/10566 | 4/1995 | WIPO | C08L 23/04 |
| 96/12762 | 6/1996 | WIPO | C08L 23/04 |

OTHER PUBLICATIONS

Kissin, "Olefin Polymers", Enc. Chem. Tech., vol. 17, p. 704 (1996).

*Primary Examiner*—Donald R. Wilson

[57] ABSTRACT

This invention relates to an improved shrink film having balanced properties. In particular, this invention relates to a biaxially oriented polyolefin shrink film made from a particular polymer mixture which includes a first ethylene polymer component having a single differential scanning calorimetry (DSC) melting peak or a single Analytical Temperature Rising Elution Fractionation (ATREF) peak and a second ethylene polymer component having one or more DSC melting peaks, wherein the density differential between the two component polymers about 0 to about 0.03 g/cc. Improved properties include increased shrink responses, wide orientation windows, higher modulus and high softening temperatures.

8 Claims, 1 Drawing Sheet

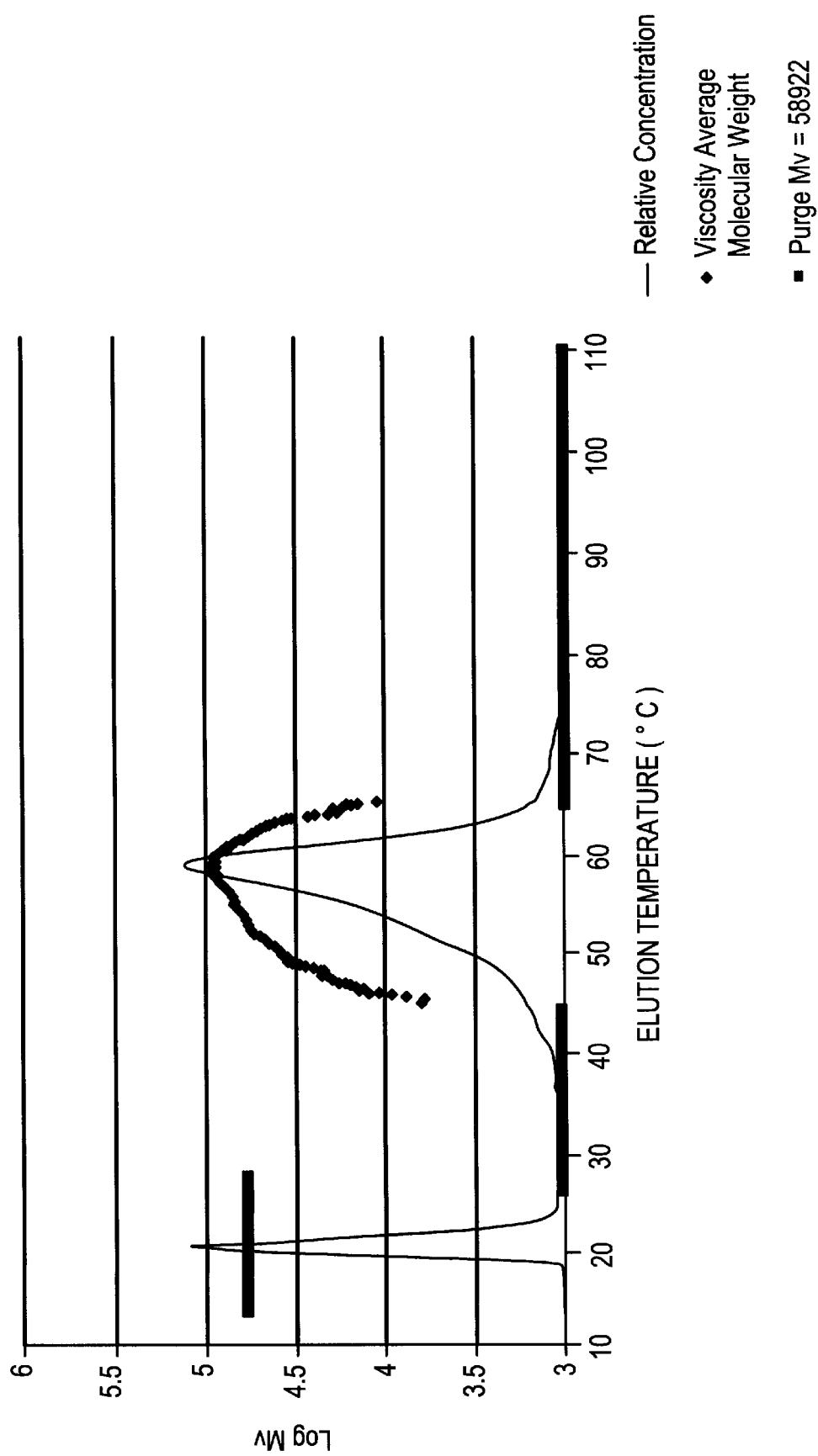

//5,972,444

POLYOLEFIN COMPOSITIONS WITH BALANCED SHRINK PROPERTIES

CROSS-REFERENCE TO RELATED APPLICATIONS (This is a continuation-in-part of application Ser. No. 08/428,273, filed Apr. 25, 1995, now U.S. Pat. No. 5,632, 510, which is a division of application Ser. No. 08/055,063, filed Apr. 28, 1993, now U.S. Pat. No. 5,562,958, which is a continuation-in-part of application Ser. No. 07/916,269, filed Jul. 21, 1992, now U.S. Pat. No. 5,296,175, and a continuation-in-part of application Ser. No.08/024,563, filed Mar. 1, 1993, now abandoned, which is a continuation in part of application Ser. No. 07/776,130, filed Oct. 15, 1991, now U.S. Pat. No. 5,272,376.) This application also claims the benefits of provisional application Ser. No. 60/011,874, filed Feb. 20, 1996. The disclosure of all of the above applications are incorporated herein by reference.

FIELD OF THE INVENTION

This invention relates to an improved shrink film. In particular, this invention relates to a biaxially oriented polyolefin shrink film made from a polymer mixture comprised of (A) a first ethylene polymer component having a single differential scanning calorimetry (DSC) melting peak and a single Analytical Temperature Rising Elution Fractionation (ATREF) peak or (B) a second ethylene polymer component having one or more DSC melting peaks, wherein the density differential between component(A) and component (B) is in the range from about 0 to about 0.03 g/cc.

BACKGROUND OF THE INVENTION

Food items such as poultry, fresh red meat and cheese, as well as nonfood industrial and retail goods, are packaged by various heat shrink film methods. There are two main categories of heat shrink films—hot-blown shrink film and oriented shrink film. Hot-blown shrink film is made by a hot-blown simple bubble film process and oriented shrink film is made by elaborate processes known as double bubble, tape bubble, trapped bubble or tenter framing. Heat shrink films can be monoaxial or biaxial oriented and are required to possess various other film attributes. In addition to a high shrink response, for successful use in hot-fill or cook-in applications, shrink films must also possess a relatively high softening point.

The shrink packaging method generally involves placing an article(s) into a bag (or sleeve) fabricated from a heat shrink film, then closing or heat sealing the bag, and thereafter exposing the bag to sufficient heat to cause shrinking of the bag and intimate contact between the bag and article. The heat can be provided by conventional heat sources, such as heated air, infrared radiation, hot water, combustion flames, or the like. Heat shrink wrapping of food articles helps preserve freshness, is attractive, hygienic, and allows closer inspection of the quality of the packaged food. Heat shrink wrapping of industrial and retail goods, which is alternatively referred to in the art and herein as industrial and retail bundling, preserves product cleanliness and also is a convenient means of bundling and collating for accounting and transporting purposes.

The biaxial heat-shrink response of an oriented polyolefin film is obtained by initially stretching fabricated film to an extent several times its original dimensions in both the machine and transverse directions to orient the film. The stretching is usually accomplished while the fabricated film is sufficiently soft or molten, although cold drawn shrink films are also known in the art. After the fabricated film is stretched and while still in a stretched condition, the stretch orientation is frozen or set in by quick quenching of the film. Subsequent application of heat will then cause the oriented film to relax and, depending on the actual shrink temperature, the oriented film can return essentially back to its original unstretched dimensions, i.e., to shrink relative to its stretched dimension.

Hence, clearly the orientation window and shrink response of oriented films affected by resin properties and fabrication parameters. The orientation window depends upon the broadness of the resin melting range and, as such, relates directly to the short chain branching distribution of the resin. In general, ethylene alpha-olefin interpolymers having a broad short chain branching distribution and broad melting range (e.g., heterogeneously branched ultra low density polyethylene resins such as ATTANE™ resins supplied by The Dow Chemical Company) exhibit a wider orientation window compared to ethylene alpha-olefin interpolymers characterized as having a narrow short chain branching distribution and narrow melting range (e.g., homogeneously branched linear ethylene polymers such as EXCEED™ and EXACT™ resins supplied by Exxon Chemical Corporation).

Oriented polyolefin film shrinkage depends on shrink tension and film density. Film shrinkage is decreased as the orientation temperature is increased due to lower shrink tension. Film shrinkage is increased at lower density (lower crystallinity) because crystallites provide topological constraints and, as such, hinder free shrinkage. Conversely, for given draw ratio, shrink tension depends on the crystallinity of the resin at the orientation temperature.

While the temperature at which a particular polymer is sufficiently soft or molten is a critical factor in various orientation techniques, in general, such temperatures are ill-defined in the art. Disclosures pertaining to oriented films that disclose various polymer types (which invariably have varying polymer crystallinities and melting points), simply do not define the stretching or orientation temperatures used for the reported comparisons. U.S. Pat. No. 4,863,769 to Lustig et al., WO 95/00333 to Eckstein et al., and WO 94/07954 to Garza et al., the disclosures of which are incorporated herein by reference, are two examples of such disclosures.

The direct effect of density or crystallinity on shrink response and other desired shrink film properties such as, for example, impact resistance, are known, for example, from WO 95/08441, the disclosure of which is incorporated herein by reference. That is, even where the orientation temperature is presumably constant, lower density polymer films will show a higher shrink response and improved impact resistance. However, the effects of density and other resin properties on the orientation temperature is not well-known. In the prior art, there are only general rules of thumb or generalized teachings relating to suitable stretching or orientation conditions. For example, in commercial operations, it is often said that the temperature at which the film is suitably soft or molten is just above its respective glass transition temperature, in the case of amorphous polymers, or below its respective melting point, in the case of semi-crystalline polymers.

While the effects of density and other resin properties on the optimum orientation temperature of polyolefins are generally unknown, it is clear that heterogeneously branched ethylene polymers such as ATTANE™ resins and DOWLEX™ resin have a relatively broad orientation window (i.e., the temperature range at which the resin can be substantially stretched when molten or softened). It also clear that softening temperatures and other film properties such as, for example, secant modulus, tend to decrease at lower polymer densities. Because of these relationships, films with high shrink responses, wide orientation windows, high modulus and high softening temperatures (i.e., shrink films with balanced properties) are unknown in the prior art. That is, polymer designers invariably have to sacrifice high softening temperatures and high modulus to provide films with high shrink responses and wide orientation windows. The importance of higher modulus pertains to, for example, the need for good machinability during automatic packaging operations and good handling during bag making operations.

An example of teaching that's beyond ordinary rules of thumb (but is nevertheless fairly generalized) is provided by Golike in U.S. Pat. No. 4,597,920, the disclosure of which is incorporated herein by reference. Golike teaches orientation should be carried out at temperatures between the lower and higher melting points of a copolymer of ethylene with at least one $C_8$–$C_{18}$ α-olefin. Golike specifically teaches that the temperature differential is at least 10° C., however, Golike also specifically discloses that the full range of the temperature differential may not be practical because, depending on the particular equipment and technique used, tearing of the polymer film may occur at the lower end of the range. At the higher limit of the range, Golike teaches the structural integrity of the polymer film begins to suffer during stretching (and ultimately fails at higher temperatures) because the polymer film then is in a soft, molten condition. See, U.S. Pat. No. 4,597,920, Col. 4, lines 52–68 bridging to Col. 5., lines 1–6. The orientation temperature range defined by Golike (which is based on higher and lower peak melting points) generally applies to polymer blends and heterogeneously branched ethylene/α-olefin interpolymers, i.e. compositions having two or more DSC melting points, and does not apply at all to homogeneously branched ethylene/α-olefin interpolymers which have only a single DSC melting point. Golike also indicates that a person of ordinary skill can determine the tear temperature of a particular polymer and discloses that for heterogeneously branched interpolymers having a density of about 0.920 g/cc, the tear temperature occurs at a temperature above the lower peak melting point. See, U.S. Pat. No. 4,597,920, Col. 7, Example 4. However, Golike does not teach or suggest how a person of ordinary skill in the art of shrink film can optimize the orientation process as to stretching temperature at a given stretching rate and ratio to maximize the shrink response and achieve balanced properties.

Hideo et al. in EP 0359907 A2, the disclosure of which is incorporated herein by reference, teach the film surface temperature at the starting point of stretching should be within the range of from 20° C. to about 30° C. below the melting temperature of the polymer as determined in regards to the main DSC endothermic peak. While such teaching is considered applicable to homogeneously branched ethylene/α-olefin interpolymers having a single DSC melting peak, the prescribed range is fairly general and broad. Moreover, Hideo et al. do not provide any specific teaching as to the optimum orientation temperature for a particular interpolymer respecting heat shrink response, nor any other desired shrink film property.

WO 95/08441, the disclosure of which is incorporated herein by reference, provides generalized teachings pertaining to homogeneously branched ethylene/cc-olefin interpolymers. In the Examples of this disclosure, several different homogeneously branched substantially linear ethylene/α-olefin interpolymers were studied and compared to one heterogeneously branched ethylene/ α-olefin interpolymers. Although the homogeneously branched substantially linear ethylene/α-olefin interpolymers had densities that varied from about 0.896 to about 0.906 g/cc, all of the interpolymers (including the heterogeneously branched linear ethylene/α-olefin interpolymer, ATTANE™ 4203, supplied by The Dow Chemical Company, which had a density of 0.905 g/cc) were oriented at essentially the same orientation temperatures. Reported results in WO 95/08441 disclose three general findings: (1) at an equivalent polymer density, substantially linear ethylene/α-olefin interpolymers and heterogeneously branched linear ethylene/cc-olefin interpolymers have essentially equivalent shrink responses (compare Example 21 and Example 39 at pages 15–16), (2) shrink responses increase at lower densities and constant orientation temperatures, and (3) as orientation temperature increases, orientation rates increase. Furthermore, careful study of the Examples and unreported DSC melting point data for the interpolymers reported on in WO 95/08441 indicate for the Examples disclosed in WO 95/08441 that, at a given stretching rate and ratio, there is a preference for orienting multilayer film structures at orientation temperatures above the respective DSC melting point of the polymer employed as the shrink control layer. Moreover, none of the teachings or Examples in WO 95/08441 suggest a shrink film with balanced properties is obtainable.

Other disclosures that set forth orientation information regarding homogeneously branched ethylene polymers yet do not specify orientation conditions relative to respective lowest stretch temperatures, nor teach requirements for balanced shrink film properties include EP 0 600425A1 to Babrowicz et al. and EP 0 587502 A2 to Babrowicz et al., the disclosures of which are incorporated herein by reference.

Accordingly, although there are general rules and general disclosures as to shrink responses and suitable orientation temperatures for biaxially orienting polyolefins, there is no specific information as to optimum orientation conditions as a function of polymer type and, more importantly, there is no specific information as to balanced or optimized shrink responses, wide orientation windows, high modulus and high softening temperatures. As such, it is an object of the present invention to provide an improved shrink film with a maximized shrink response, an increased orientation window and, for a given modulus or polymer density, a relatively high softening temperature . This and other objects will become apparent from the description and various that follow.

SUMMARY OF THE INVENTION

In accordance with the present invention, we have discovered that for polymer mixtures comprised of at least two ethylene polymers, when the density differential between the component polymers is selectively controlled and optimized, a substantially improved shrink film is obtained. The improved shrink film will have a high shrink response, a wide orientation window and a relatively high softening temperature.

A broad aspect of the present invention is a shrink film comprising a polymer mixture wherein the polymer mixture has a density in the range of about 0.88 gram/centimeter (g/cc) to about 0.94 g/cc as determined in accordance with ASTM D-792 and includes (A) from about 20 to about 80 weight percent, based on the total weight of the polymer mixture, of at least one first ethylene polymer characterized as having a single melting peak as determined using differential scanning calorimetry (DSC) or a single Analytical Temperature Rising Elution Fractionation (ATREF) peak and a density in the range of about 0.87 (g/cc) to about 0.93 g/cc as determined in accordance with ASTM D-792, and (B) from about 20 to about 80 weight percent, based on the total weight of the polymer mixture, of at least one second ethylene polymer characterized as having one or more melting peaks as determined using differential scanning calorimetry (DSC) and a density in the range of about 0.89 (g/cc) to about 0.96 g/cc as determined in accordance with ASTM D-79, wherein the density differential between the first and second ethylene polymer components, determined in accordance with ASTM D-792, is in the range of from about 0 to about 0.03 g/cc and the molecular weight of the at least one first ethylene polymer is higher than the molecular weight of the least one second ethylene polymer.

Unexpectedly, the present inventive shrink film shows an improved shrink response at a comparatively higher density while typically lower densities are required for such improvement. As another unexpected surprise, the inventive shrink film also shows a comparatively high softening temperature for its given shrink response where typically for ethylene alpha-olefin interpolymer softening temperatures are reduced where the shrink response is improved. Stated differently, the inventive shrink film exhibits surprisingly higher shrinkage at equivalent or higher softening temperature whereas for prior art materials, softening temperatures must be decreased for higher shrinkage performance.

While the present invention allows practitioners to realize increased unrestrained shrink performance, the benefits of this invention are particularly useful for those common commercial instances where the orientation temperature capabilities of the stretching operation are essentially fixed. That is, by providing an increased orientation window, a film composition that could not be successfully stretched at all within a given equipment capability can now be conveniently oriented.

BRIEF DESCRIPTION OF DRAWING

FIG. 1 is an Analytical Temperature Rising Elution Fractionation curve of an ethylene polymer having a single ATREF peak.

DEFINITIONS OF TERMS

The term "polymer", as used herein, refers to a polymeric compound prepared by polymerizing monomers, whether of the same or a different type. The generic term "polymer" thus embraces the terms "homopolymer," "copolymer," "terpolymer" as well as "interpolymer."

The term "interpolymer", as used herein, refers to polymers prepared by the polymerization of at least two different types of monomers. The generic term "interpolymer" thus includes the term "copolymers" (which is usually employed to refer to polymers prepared from two different monomers) as well as the term "terpolymers" (which is usually employed to refer to polymers prepared from three different types of monomers).

"Stretched" and "oriented" are used in the art and herein interchangeably, although orientation is actually the consequence of a film being stretched by, for example, internal air pressure pushing on the tube or by a tenter frame pulling on the edges of the film.

The term "lowest stretch temperature" as used herein means the temperature below which the film either tears and/or stretches unevenly for a given stretching rate and stretching (draw) ratio during the stretching operation or step of an orientation technique. The lowest stretch temperature is (1) below the melting point of the film, (2) a temperature below which the film can not be uniformly stretched (i.e., without the occurrence of banding or necking or the sample dislodging from the grips of the stretcher at grip pressures of about 500 psi), and (3) a temperature below which the film tears for a particular stretching rate and stretch ratio.

Practitioners will appreciate that to maximize the stretch imparted and therefore the shrink response, the objective is to operate as close to the lowest stretch temperature as their equipment and capabilities will allow whether or not the significant stretching or orientation is accomplished in a single step or by a combination of sequential steps.

Additionally, practitioners will appreciate that the optimum or near-optimum stretching temperature for maximized shrink response at a given shrink temperature will interrelate with stretching rate and ratio. That is, while a particular stretching temperature will be optimum or near-optimum at one combination of stretching rate and ratio, the same stretching temperature will not be optimum or near-optimum at a different combination of stretching rate and ratio.

Practitioners will also appreciate that to obtain the maximum shrink response from the orientation frozen into the film, the shrink temperature should match or exceed the stretching temperature. That is, reduced shrink temperatures do not allow full relaxation or shrinkage of the film. However, excessive shrink temperatures can diminish film integrity.

Practitioners will further appreciate that for a given combination of stretching temperature, stretching rate and stretching ratio, increases in the shrink temperature to the point of film integrity failure will yield higher shrink response performance and higher levels of shrink tension.

Shrink temperatures in the range of from about 70 to about 140° C., especially from about 80 to about 125° C., and more especially from about 85 to about 110° C. are suitable in the present invention.

The term "residual crystallinity" is used herein to refer the crystallinity of a polymer film at a particular stretching temperature. Residual crystallinity is determined using a Perkin-Elmer DSC 7 set for a first heat at 10° C./min. of a water-quenched, compression molded film sample of the polymer. The residual crystallinity for an interpolymer at a particular temperature is determined by measuring heat of fusion between that temperature and the temperature of complete melting using a partial area technique and by dividing the heat of fusion by 292 Joules/ gram. The heat of fusion is determined by computer integration of the partial area using Perkin-Elmer PC Series Software Version 3.1.

The term "shrink control layer" is used herein to refer to the film layer that provides or controls the shrink response. Such a layer is inherent to all heat shrink films. In a monolayer heat shrink film, the shrink control layer will be the film itself. In a multilayer heat shrink film, the shrink control layer is typically the core or an inside film layer and is typically the thickest film layer. See, for example, WO 95/08441.

The term "substantially unoriented form" is used herein in reference the fact that some amount of orientation is usually imparted to a film during ordinary fabrication. As such, it is meant that the fabrication step, in itself, is not used to impart the degree of orientation required for the desired or required shrink response. The present invention is thought to be generally applicable to operations where the fabrication and orientation steps are separable and occur simultaneously. However, the present invention is preferably directed to an additional and separate orientation step which is required beyond the making of tube, sock, web or layflat sheet whether or not such is soft, molten, or irradiated before substantial orientation is imparted.

DETAILED DESCRIPTION OF THE INVENTION

Double bubble and trapped bubble biaxial orientation methods can be simulated on a laboratory scale using a T. M. Long stretcher which is analogous to a tenter frame device. This device can orient polyolefin films in both the monoaxial and biaxial mode at stretching ratios up to at least 5:1. The device uses films having an original dimension of 2 inches×2 inches. Biaxial stretching is usually performed by stretching in the machine direction and transverse direction of the film simultaneously, although the device can be operated to stretch sequentially.

The residual crystallinity of polyolefin interpolymers (measured using a DSC partial area method) can be used to characterize the nature of polyolefin film at the orientation temperature. In general, it preferred to orient polyolefin films at a an orientation temperature where the residual crystallinity of the film is as high as possible. Such an orientation will generally be only a few degree above that temperature where the film can no longer be successfully oriented. That is, about 5° C. above, preferably about 3° C. above, more preferably about 2.5° C. above the lowest stretch temperature (defined herein above) is considered herein to be the optimum or near-optimum stretching or orientation temperature for the particular film. Stretching temperatures less than about 2.5° C. above the lowest stretch temperature are not preferred because they tend to yield inconsistent results, although such inconsistencies tend to depend on specific equipment and temperature control capabilities. However, for proper comparison of various films, an orientation temperature should be selected such that the residual crystallinity at orientation is approximately the same for each film. That is, although wide orientation windows are desired, selection of the actual orientation temperature to be employed should never be arbitrary.

The density differential between the at least one first ethylene polymer component (A) and the at least one second ethylene polymer component (B) is generally in the range of from about 0 to about 0.03 g/cc, preferably in the range of from about 0.01 to about 0.03 g/ cc, more preferably in the range of from about 0.015 to about 0.025 g/cc, as measured in accordance with ASTM D-792. A percent DSC crystallinity may also be used to characterize the at least one first ethylene polymer component and the at least one second ethylene polymer component. That is, the percent DSC crystallinity differential between the at least one first ethylene polymer component (A) and the at least one second ethylene polymer component (B) is generally in the range of from about 0 to about 23%, preferably in the range of from about 7 to about 20%, more preferably in the range of from about 10 to about 18%.

The first ethylene polymer component (A) has a density in the range of from about 0.87 to about 0.93 g/cc, preferably from about 0.88 to about 0.92 g/cc (as measured in accordance with ASTM D-792). The second ethylene polymer component (B) has a density in the range of from about 0.89 to about 0.96 g/cc, preferably from about 0.90 to about 0.94 g/cc (as measured in accordance with ASTM D-792). Additionally, it is preferred that the density of the at least one first ethylene polymer component (A) is lower than the density of the at least one second ethylene polymer component (B).

The overall density of the polymer mixture (i.e., the combination of component (A) and component (B) is generally in the range of from about 0.88 to about 0.94 g/cc, preferably in the range of from about 0.89 to about 0.93 g/cc, more preferably in the range of from about 0.90 to about 0.93 g/cc, and most preferably in the range of from about 0.90 to about 0.92 g/cc (as measured in accordance with ASTM D-792).

The first ethylene polymer component of the polymer mixture used in the invention, Component (A), is at least one ethylene polymer having a single DSC melting peak or a single ATREF peak. By single ATREF peak, it is meant that the purge portion or non-crystallizable polymer fraction observed in a typical ATREF curve is not considered to be an ATREF peak. For example, in FIG. 1, the elution at the elution temperature of about 20° C. is a purge portion and not an ATREF peak. As such, the polymer is characterized as having a single ATREF peak which peaks at an elution temperature of about 57.5° C. Suitable polymers for use as the at least one first ethylene polymer, include homogeneously branched substantially linear ethylene polymers and homogeneously branched linear ethylene polymers.

The second component polymer of the polymer mixture is at least one ethylene polymer having one or more DSC melting peaks. Suitable polymers for use as the at least one second ethylene polymer include heterogeneously branched linear low density polyethylene (e.g., linear low density polyethylene and ultra or very low density polyethylene), substantially linear ethylene polymers, homogeneously branched linear ethylene polymers, high pressure ethylene polymers (e.g., low density polyethylene, ethylene vinyl acetate (EVA) copolymer, ethylene acrylic acid (EAA) copolymer or ethylene methacrylic acid (EMAA) ionomer) and combinations or mixtures thereof.

However, preferably the first ethylene polymer component (A) is at least one substantially linear ethylene polymer and the second component polymer (B) is a heterogeneously branched linear ethylene polymer. Substantially linear ethylene polymers are preferred as the first ethylene polymer component (A) due to their improved melt extrusion processability and unique Theological properties as described by Lai et. al in U.S. Pat. No. Nos. 5,272,236 and 5,278,272, the disclosures of which are incorporated herein by reference.

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. Component (A) and component (B) will be independently characterized by an $I_2$ melt index with the at least one first ethylene polymer having a higher molecular weight than the at least one second ethylene polymer. By "independently characterized" it is meant that the $I_2$ melt index of component (A) need not be the same as the $I_2$ melt index of component (B).

The first ethylene polymer component (A) has an $I_2$ melt index in the range of from greater than or equal to about 0.01 g/10 minutes to less than or equal to about 50 g/10 minutes, preferably from greater than or equal to about 0.05 g/10 minutes to less than or equal to about 20 g/10 minutes, most preferably from greater than or equal to about 0.5 g/10 minutes to less than or equal to about 10 g/10 minutes.

The second ethylene polymer component (B) may have an $I_2$ melt index in the range of from about 0.01 g/10 minutes to about 100 g/10 minutes, preferably from about 0.05 g/10 minutes to 50 g/10 minutes, more preferably from about 0.1 g/10 minutes to about 20 g/10 minutes, and most preferably from about 0.5 g/10 minutes to about 10 g/10 minutes.

The overall melt index of the polymer mixture is preferably in the range of from about 0.1 to about 5 g/10 minutes, more preferably from about 0.5 to about 4 g/10 minutes.

Other measurements useful in characterizing the molecular weight of substantially linear ethylene interpolymers and homopolymers involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$. For the substantially linear ethylene polymers used to prepare the films of the present invention, the melt flow ratio indicates the degree of long chain branching, i.e., the higher the $I_{10}/I_2$ melt flow ratio, the more long chain branching in the polymer. In addition to being indicative of more long chain branching, higher $I_{10}/I_2$ ratios are also indicative of lower viscosity at higher shear rates (easier processing) and higher extensional viscosity.

In general, the at least one first ethylene polymer component (A) has an $I_{10}/I_2$ melt flow ratio greater than about 6, preferably from greater than about 7, more preferably greater than 8, and most preferably in the range of from about 8.5 to about 20. Embodiments that meet the specified density differential and have an $I_{10}/I_2$ melt flow ratio greater than about 8 are particularly preferred embodiments of the present invention.

The first ethylene polymer component (A) generally constitutes from about 20 to about 80 weight percent of the polymer mixture, based on the total weight of the polymer mixture and preferably from about 30 to about 70 weight percent of the polymer mixture, based on the total weight of the polymer mixture. Conversely, the polymer mixture used in the present invention comprises from about 20 to about 80 weight percent and preferably from about 30 to 70 weight percent of the at least one second ethylene polymer component (B), based on the total weight of the polymer mixture.

Suitable ethylene polymers for use as the second component polymer (B) include substantially linear ethylene interpolymers, homogeneously branched linear ethylene interpolymers, heterogeneously branched linear ethylene interpolymers (e.g., linear low density polyethylene (LLDPE), medium density polyethylene (MDPE), high density polyethylene (HDPE) and ultra low or very low density polyethylene (ULDPE or VLDPE)), and combinations or mixtures thereof.

Substantially linear ethylene polymers are sold under the designation of AFFINITY™ and ENGAGE™ resins by The Dow Chemical Company and Dupont Dow Elastomers, respectively. Homogeneously branched linear ethylene polymers are sold under the designation of TAFMER™ by Mitsui Chemical Corporation and under the designation of EXACT™ and EXCEED™ resins by Exxon Chemical Corporation, respectively. Heterogeneously branched linear ethylene polymers are sold under the designations of ATTANE™ and DOWLEX™ by The Dow Chemical Company and under the designation of FLEXOMER by Union Carbide Corporation.

The term "homogeneously branched linear ethylene polymer" is used in the conventional sense in reference to a linear ethylene interpolymer in which the comonomer is randomly distributed within a given polymer molecule and wherein substantially all of the polymer molecules have the same ethylene to comonomer molar ratio. The terms refer to an ethylene interpolymer that is characterized by a relatively high short chain branching distribution index (SCBDI) or composition distribution branching index (CDBI). That is, the interpolymer has a SCBDI greater than or equal to about 50 percent, preferably greater than or equal to about 70 percent, more preferably greater than or equal to about 90 percent and essentially lack a measurable high density (crystalline) polymer fraction in TREF analysis.

SCBDI is defined as the weight percent of the polymer molecules having a comonomer content within 50 percent of the median total molar comonomer content and represents a comparison of the monomer distribution in the interpolymer to the monomer distribution expected for a Bernoullian distribution. The SCBDI of an interpolymer can be readily calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), or in U.S. Pat. Nos. 4,798,081; 5,008,204; or by L. D. Cady, "The Role of Comonomer Type and Distribution in LLDPE Product Performance," SPE Regional Technical Conference, Quaker Square Hilton, Akron, Ohio, October 1–2, pp. 107–119 (1985), the disclosures of all which are incorporated herein by reference. However, the preferred TREF technique does not include purge quantities in SCBDI calculations. More preferably, the monomer distribution of the interpolymer and SCBDI are determined using $^{13}C$ NMR analysis in accordance with techniques described in U.S. Pat. No. 5,292,845 and by J. C. Randall in Rev. Macromol. Chem. Phys., C29, pp. 201–317, the disclosures of both of which are incorporated herein by reference.

In addition to referring to a homogeneous (or narrow) short branching distribution, the term "homogeneously branched linear ethylene interpolymer" also means the interpolymer does not have long chain branching. That is, the ethylene interpolymer has an absence of long chain branching and a linear polymer backbone in the conventional sense of the term "linear." However, the term "homogeneously branched linear ethylene polymer" does not refer to high pressure branched polyethylene which is known to those skilled in the art to have numerous long chain branches. Homogeneously branched ethylene polymers can be made using polymerization processes (e.g., those described by Elston in U.S. Pat. No. 3,645,992) which provide a uniform (narrow) short branching distribution (i.e., homogeneously branched). In his polymerization process, Elston uses soluble vanadium catalyst systems to make such polymers, however others such as Mitsui Chemical Corporation and Exxon Chemical Corporation have used so-called single site catalyst systems to make polymers having a similar homogeneous structure. Homogeneously branched linear ethylene polymers can be prepared in solution, slurry or gas phase processes using hafnium, zirconium and vanadium catalyst systems. Ewen et al. in U.S. Pat. No. 4,937,299 describe a method of preparation using metallocene catalysts. The disclosures of Elston and Ewen et al. are incorporated herein by reference.

The term "heterogeneously branched linear ethylene polymer" is used herein in the conventional sense in reference to a linear ethylene interpolymer having a comparatively low short chain branching distribution index. That is, the interpolymer has a relatively broad short chain branching distribution. Heterogeneously branched linear ethylene polymers have a SCBDI less than about 50 percent and more typically less than about 30 percent.

Heterogeneously branched ethylene polymers are well known among practitioners of the linear polyethylene art. Heterogeneously branched ethylene polymers are prepared using conventional Ziegler-Natta solution, slurry or gas phase polymerization processes and coordination metal catalysts as described, for example, by Anderson et al. in U.S. Pat. No. 4,076,698, the disclosure of which is incorporated herein by reference. These conventional Ziegler-Natta type linear polyethylenes are not homogeneously branched, do not have any long-chain branching and, as such, have a linear polymer backbone in the conventional sense of the term "linear." At densities less than 0.90 g/cc, these materials are more difficult to prepare than homogeneously branched ethylene polymer and are also more difficult to pelletize than their higher density counterparts. At such lower densities, heterogeneously branched ethylene polymer pellets are generally more tacky and have a greater tendency to clump together than their higher density counterparts.

Typically, the homogeneously branched linear ethylene polymer and the heterogeneously branched ethylene polymer are ethylene/$\alpha$-olefin interpolymers, wherein the $\alpha$-olefin is at least one $C_3$–$C_{20}$ $\alpha$-olefin (e.g., propylene, 1-butene, 1-pentene, 4methyl-1-pentene, 1-hexene, 1-octene and the like) and preferably the at least one $C_3$–$C_{20}$ $\alpha$-olefin is 1-hexene. Most preferably, the ethylene/ $\alpha$-olefin interpolymer is a copolymer of ethylene and a $C_3$–$C_{20}$ $\alpha$-olefin, especially an ethylene/$C_4$–$C_6$ $\alpha$-olefin copolymer and most especially an ethylene/1-hexene copolymer.

The term "substantially linear ethylene polymer" as used herein refers to homogeneously branched ethylene/$\alpha$-olefin interpolymers that have a narrow short chain branching distribution and contain long chain branches as well as short chain branches attributable to homogeneous comonomer incorporation. The long chain branches are of the same structure as the backbone of the polymer and are longer than the short chain branches. The polymer backbone of substantially linear ($\alpha$-olefin polymers is substituted with an average of 0.01 to 3 long chain branch/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branches/1000 carbons.

Long chain branching is defined herein as a chain length of at least 6 carbons, above which the length cannot be distinguished using $^{13}$C nuclear magnetic resonance spectroscopy. The long chain branch can be as long as about the same length as the length of the polymer backbone to which it is attached. Long chain branches are obviously of greater length than of short chain branches resulting from comonomer incorporation.

The presence of long chain branching can be determined in ethylene homopolymers by using $^{13}$C nuclear magnetic resonance (NMR) spectroscopy and is quantified using the method described by Randall (Rev. Macromol. Chem. Phys., C29, V. 2 & 3, p. 285–297).

As a practical matter, current $^{13}$C nuclear magnetic resonance spectroscopy cannot determine the length of a long chain branch in excess of six carbon atoms. However, there are other known techniques useful for determining the presence of long chain branches in ethylene polymers, including ethylene/ 1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., J. Chem. Phys., 17, 1301 (1949) and Rudin, A., *Modem Methods of Polymer Characterization,* John Wiley & Sons, New York (1991) pp. 103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/ octene copolymers.

deGroot and Chum also showed that a plot of Log($I_2$, Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

The substantially linear ethylene polymers used in the present invention are a unique class of compounds that are further defined in U.S. Pat. No. 5,272,236, Ser. No. 07/776, 130, filed Oct. 15, 1991 and in U.S. Pat. No. 5,278,272, Ser. No. 07/939,281, filed Sep. 2, 1992, each of which is incorporated herein by reference.

Substantially linear ethylene polymers differ significantly from the class of polymers conventionally known as homogeneously branched linear ethylene polymers described, for example, by Elston in U.S. Pat. No. 3,645,992, in that substantially linear ethylene polymers do not have a linear polymer backbone in the conventional sense of the term "linear." Substantially linear ethylene polymers also differ significantly from the class of polymers known conventionally as heterogeneously branched traditional Ziegler polymerized linear ethylene interpolymers (for example, ultra low density polyethylene, linear low density polyethylene or high density polyethylene made, for example, using the technique disclosed by Anderson et al. in U.S. Pat. No. 4,076,698, in that substantially linear ethylene interpolymers are homogeneously branched interpolymers. Substantially linear ethylene polymer's also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalysts systems.

Single site polymerization catalyst (for example, the monocyclo-pentadienyl transition metal olefin polymerization catalysts described by Canich in U.S. Pat. No. 5,026,798 or by Canich in U.S. Pat. No. 5,055,438) or, more preferably, single site constrained geometry catalysts (for example, as described by Stevens et al. in U.S. Pat. No. 5,064,802) can be used to prepare substantially linear ethylene polymers, so long as the catalysts are used consistent with the methods described in U.S. Pat. No. 5,272,236 and in U.S. Pat. No. 5,278,272. Such polymerization methods are also described in PCT/US 92/08812 (filed Oct. 15, 1992). However, the substantially linear ethylene polymers are preferably made by using suitable constrained geometry catalysts, especially constrained geometry catalysts as disclosed in U.S. application Ser. Nos.: 545,403, filed Jul. 3, 1990; U.S. Pat. No. 5,132,380; U.S. Pat. No. 5,064,802; U.S. Pat. No. 5,153,157; U.S. Pat. No. 5,470,993; U.S. Pat. No. 5,453,410; U.S. Pat. No. 5,374,696; U.S. Pat. No. 5,532,394; U.S. Pat. No. 5,494,874; U.S. Pat. No. 5,189,192; the teachings of all of which are incorporated herein by reference.

Suitable cocatalysts for use herein include but are not limited to, for example, polymeric or oligomeric aluminoxanes, especially methyl aluminoxane or modified methyl aluminoxane (made, for example, as described in U.S. Pat. No. 5,041,584, U.S. Pat. No. 4,544,762, U.S. Pat. No. 5,015,749, and/or U.S. Pat. No. 5,041,585, the disclosures of which are incorporated herein by reference) as well as inert, compatible, non-coordinating, ion forming compounds. Preferred cocatalysts are inert, non-coordinating, boron compounds.

The polymerization conditions for manufacturing the substantially linear ethylene polymers used in the present invention are preferably those useful in the continuous solution polymerization process, although the application of the present invention is not limited thereto. Continuous slurry and gas phase polymerization processes can also be used, provided the proper catalysts and polymerization conditions are employed. To polymerize the substantially linear polymers useful in the invention, the single site and constrained geometry catalysts mentioned earlier can be used, but for substantially linear ethylene polymers the polymerization process should be operated such that substantially linear ethylene polymers are indeed formed. That is, not all polymerization conditions inherently make the substantially linear ethylene polymers, even when the same catalysts are used. For example, in one embodiment of a polymerization process useful in making substantially linear ethylene polymers, a continuous process is used, as opposed to a batch process.

The substantially linear ethylene polymer for use in the present invention is characterized as having (a) a melt flow ratio, $I_{10}/I_2$, equal to or greater than 5.63, (b) a molecular weight distribution, $M_w/M_n$, as determined by gel permeation chromatography and defined by the equation:

$$(M_w/M_n) \leq (I_{10}/I_2) - 4.63,$$

(c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an $I_2$, $M_w/M_n$ and density within ten percent of the substantially linear ethylene polymer and wherein the respective critical shear rates of the substantially linear ethylene polymer and the linear ethylene polymer are measured at the same melt temperature using a gas extrusion rheometer, (d) a single differential scanning calorimetry, DSC, melting peak between −30 and 150° C., and (e) a short chain branching distribution index greater than about 50 percent.

The substantially linear ethylene polymers used in this invention are homogeneously branched interpolymers and essentially lack a measurable "high density" fraction as measured by the TREF technique (i.e., have a narrow short chain distribution and a high SCBD index). The substantially linear ethylene polymer generally do not contain a polymer fraction with a degree of branching less than or equal to 2 methyls/1000 carbons. The "high density polymer fraction" can also be described as a polymer fraction with a degree of branching less than about 2 methyls/1000 carbons.

The substantially linear ethylene interpolymers for use in the present 20 invention are interpolymers of ethylene with at least one $C_3$–$C_{20}$ α-olefin and/or $C_4$–$C_{18}$ diolefin. Copolymers of ethylene and an (α-olefin of $C_3$–$C_{20}$ carbon atoms are especially preferred. The term "interpolymer" as discussed above is used herein to indicate a copolymer, or a terpolymer, or the like, where, at least one other comonomer is polymerized with ethylene or propylene to make the interpolymer.

Suitable unsaturated comonomers useful for polymerizing with ethylene include, for example, ethylenically unsaturated monomers, conjugated or non-conjugated dienes, polyenes, etc. Examples of such comonomers include $C_3$–$C_{20}$ α-olefins as propylene, isobutylene, 1-butene, 1-hexene, 4-methyl-1-pentene, 1-heptene, 1-octene, 1-nonene, 1-decene, and the like. Preferred comonomers include propylene, 1-butene, 1-hexene, 4-methyl-1-pentene and 1-octene, and 1-octene is especially preferred. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

Determination of the critical shear rate and critical shear stress in regards to melt fracture as well as other rheology properties such as "Theological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97–99. GER experiments are performed at a temperature of about 190° C., at nitrogen pressures between about 250 to about 5500 psig using about a 0.754 mm diameter, 20:1 L/D die with an entrance angle of about 180°. For the substantially linear ethylene polymers described herein, the PI is the apparent viscosity (in kpoise) of a material measured by GER at an apparent shear stress of about $2.15 \times 10^6$ dyne/cm$^2$. The substantially linear ethylene polymer for use in the invention are ethylene interpolymers having a PI in the range of about 0.01 kpoise to about 50 kpoise, preferably about 15 kpoise or less. The substantially linear ethylene polymers used herein have a PI less than or equal to about 70 percent of the PI of a linear ethylene interpolymer (either a conventional Ziegler-Natta polymerized interpolymer or a linear homogeneously branched interpolymer as described by Elston in U.S. Pat. No. 3,645,992) having an $I_2$, $M_w/M_n$ and density, each within ten percent of the substantially linear ethylene interpolymer.

An apparent shear stress versus apparent shear rate plot is used to identify the melt fracture phenomena and quantify the critical shear rate and critical shear stress of ethylene polymers. According to Ramamurthy in the *Journal of Rheology*. 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene interpolymers is at least about 50 percent greater than the critical shear rate at the onset of surface melt fracture of a linear ethylene interpolymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability and optimum sealant properties, surface defects should be minimal, if not absent. The critical shear stress at the onset of gross melt fracture for the substantially linear ethylene interpolymers used in the invention, that is those having a density less than about 0.91 g/cc, is greater than about $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER. Preferably, in the present invention, the substantially linear ethylene polymer will be characterized by its critical shear rate, rather than its critical shear stress.

Substantially linear ethylene polymers also consist of a single polymer component material and are characterized by a single DSC melting peak. The single melting peak is determined using a differential scanning calorimeter standardized with indium and deionized water. The method involves about 5–7 mg sample sizes, a "first heat" to about 140° C. which is held for about 4 minutes, a cool down at about 10°/min. to about −30° C. which is held for about 3 minutes, and heat up at about 10° C./min. to about 180° C. for the "second heat". The single melting peak is taken from the "second heat" heat flow vs. temperature curve. Total heat of fusion of the polymer is calculated from the area under the curve.

For substantially linear ethylene polymers having a density of about 0.875 g/cc to about 0.91 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for other homogeneously branched polymers such as EXACT resins and is discerned on the basis of the slope of the single melting peak varying monotonically through the melting region of the artifact. Such an artifact occurs within about 34° C., typically within about 27° C., and more typically within about 20° C. of the melting point of the single melting peak. The heat of fusion attributable to an artifact can be separately determined by specific integration of its associated area under the heat flow vs. temperature curve.

The molecular weight distributions of ethylene α-olefin polymers are determined by gel permeation chromatography (GPC) on a Waters 150 C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$Å. The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_j = (\Sigma w_i(M_i^j))^j$; where $w_i$ is the weight fraction of the molecules with molecular weight $M_i$ eluting from the GPC column in fraction i and j=1 when calculating $M_w$ and j=−1 when calculating $M_n$.

For the homogeneously branched substantially linear ethylene polymer or homogeneously branched linear ethylene polymer used in the present invention, the $M_w/M_n$ is preferably less than 3.5, more preferably less than 3.0, most preferably less than 2.5, and especially in the range of from about 1.5 to about 2.5 and most especially in the range of from about 1.8 to about 2.3.

Substantially linear ethylene polymers are known to have excellent processability, despite having a relatively narrow molecular weight distribution (that is, the $M_w/M_n$ ratio is typically less than about 3.5). Surprisingly, unlike homogeneously and heterogeneously branched linear ethylene polymers, the melt flow ratio ($I_{10}/I_2$) of substantially linear ethylene polymers can be varied essentially independently of the molecular weight distribution, $M_w/M_n$. Accordingly, the preferred ethylene α-olefin polymer for use in the present invention is a substantially linear ethylene polymer.

A preferred shrink film of the present invention will be further characterized as having a compositional hexane extractive level of less than 15 percent, preferably less than 10 percent, more preferably less than 6, most preferably less than 3 percent based on the total weight of the mixture.

Temperature rising elution fractionation (TREF) such as described by Wild et al. can be used to "fingerprint" or identify the novel mixtures of the invention.

Another preferred shrink film of the present invention will be characterized by a Vicat softening point of at least 75° C., preferably at least 85° C., and more preferably at least 90° C.

Another embodiment of the present invention is a method of making an improved shrink film either as a monolayer film or as a shrink control layer in a multilayer structure. The method of making a multilayer structure comprising the shrink control layer can include a lamination and coextrusion technique or combinations thereof, or using the polymer mixture alone, and can also specifically include blown film, cast film, extrusion coating, injection molding, blow molding, thermoforming, profile extrusion, pultrusion, compression molding, rotomolding, or injection blow molding operations or combinations thereof.

The shrink film of the present invention can be made using conventional simple bubble or cast extrusion techniques, however, preferred film structures are prepared using more elaborate techniques such as "tenter framing" or the "double bubble," "tape bubble" or "trapped bubble" process. The double bubble technique is described by Pahkle in U.S. Pat. No. 3,456,044, the disclosure of which is incorporated by reference.

The polymer mixture used in the invention can be formed by any convenient method, including dry blending the individual components and subsequently melt mixing in a mixer or by mixing the components together directly in a mixer (e.g., a Banbury mixer, a Haake mixer, a Brabender internal mixer, or a single or twin screw extruder including a compounding extruder and a side-arm extruder employed directly down stream of a interpolymerization process.

The polymer mixture used in the invention (as well as the at least one first ethylene polymer and the at least one second ethylene polymer) can be formed in-situ via the interpolymerization of ethylene and the desired alpha-olefin using a single-site catalysis, preferably a single-site constrained geometry catalyst, in at least one reactor and a single-site catalysis, preferably a single-site constrained geometry catalyst, or a Ziegler-Natta type catalyst in at least one other reactor. The reactors can be operated sequentially or in parallel. An exemplary in-situ interpolymerization process is disclosed in PCT patent application Ser. No. 94/01052, incorporated herein by reference.

The polymer mixture used in the invention (as well as the at least one first ethylene polymer and the at least one second ethylene polymer) can further be formed by isolating component (A) and/or component (B) from a heterogeneously branched ethylene polymer by fractionating the heterogeneous ethylene polymer into specific polymer fractions (or by isolating component (A) from a homogeneously branched ethylene polymer by fractionating the homogeneously ethylene polymer into polymer fractions), selecting the fraction(s) appropriate to meet the limitations specified for component (A) or component (B), and mixing the selected fraction(s) in the appropriate amounts with the at least one first ethylene polymer component (A) or the at least one second ethylene polymer component (B). This method is obviously not as economical as the in-situ polymerization described above, but can nonetheless be used to obtain the polymer mixture used in the present invention as well as the at least one first ethylene polymer and the at least one second ethylene polymer.

However, regardless of how the polymer mixture, the at least one first ethylene polymer or the at least one second ethylene polymer is manufactured, the mixture or polymer will be considered a homogeneously branched ethylene polymer or, alternatively, a heterogeneously branched ethylene polymer based on the above definitions of that refer to heterogeneous branching and homogeneous branching (i.e., the SCBDI) and based on specific whole composition analysis (such as, for example, ATREF results) rather than fractional analysis or manufacturing technique.

Additives, such as antioxidants (e.g., hindered phenolics, such as IRGANOX™ 1010 or IRGANOX™ 1076 supplied by Ciba Geigy), phosphites (e.g., IRGAFOS™ 168 also supplied by Ciba Geigy), cling additives (e.g., PIB), SANDOSTAB PEPQ™ (supplied by Sandoz), pigments, colorants, fillers, and the like may also be included in the shrink film of the present invention. Although generally not required, the shrink film of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the anti-static characteristics of the shrink film of the invention and permit the use of the inventive shrink film in, for example, the heavy-duty packaging of electronically sensitive goods.

The shrink film of the invention may further include recycled and scrap materials and diluent polymers, to the extent that the improved shrink film properties discovered by the Applicants is not adversely affected. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof.

Biaxially oriented film structures are used for their enhanced strength, barrier and/or shrink properties. Biaxially oriented film structures find utility in various packaging and storage applications for non-foodstuffs and food items such as primal and subprimal cuts of meat, ham, poultry, bacon, cheese, etc. A biaxially oriented film structure utilizing the shrink film of the present invention may be a two to seven layer structure, with a sealant layer composition (such as, for example, but not limited to, another polymer mixture, at least one homogeneous branched substantially linear ethylene polymer, at least one homogeneously branched linear ethylene polymer, or at least one heterogeneously branched ultra or very low density polyethylene), an outer layer (such as, for example, another polymer mixture or at least one heterogeneously branched linear low density or ultra-low density polyethylene), and a core layer (such as a biaxially oriented polypropylene homopolymer or vinylidene chloride polymer) interposed between. Adhesion promoting tie layers (such as PRIMACOR™ ethylene-acrylic acid (EAA) copolymers available from The Dow Chemical Company, and/or ethylene-vinyl acetate (EVA) copolymers, as well as additional structural layers (such as Affinity™ polyolefin plastomers, Engage™ polyolefin elastomers, both available from The Dow Chemical Company, ultra-low density polyethylene, or blends of any of these polymers with each other or with another polymer, such as EVA) may be optionally employed.

Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terepthalate (PET), oriented polypropylene (OPP), ethylene/vinyl acetate (EVA)

copolymers, ethylene/acrylic acid (EAA) copolymers, ethylene/methacrylic acid (EMAA) copolymers, ULDPE, LLDPE, HDPE, MDPE, LMDPE, LDPE, ionomers, graft-modified polymers (e.g., maleic anhydride grafted polyethylene), and paper. Generally, the shrink film of the present invention may be a layer in a multilayer structure which comprises from 2 to about 7 layers.

Cook-in packaged foods are foods which are prepackaged and then cooked. The packaged and cooked foods go directly to the consumer, institution, or retailer for consumption or sale. A package for cook-in must be structurally capable of withstanding exposure to cook-in time and temperature conditions while containing a food product. Cook-in packaged foods are typically employed for the packaging of ham, turkey, vegetables, processed meats, etc. Because of the relatively high softening point to shrink response characteristic of the inventive shrink film, the shrink film of the present invention is well-suited for cook-in as well as hot-fill packaging applications.

in accordance with ASTM D882 on slow-cooled compression molded samples.

The following examples are provided for the purpose of explanation and are not intended to suggest any particular limitation of the present invention.

EXAMPLES

Examples 1 and 3 and Comparative Examples 2 and 4

In an evaluation to discover the requirements for improved shrink properties, a single component ethylene polymer and three different ethylene polymer blends were evaluated. Table 1 lists the various polymers evaluated and their properties (i.e., melt index, density, Vicat softening point and description of first and second polymer components and their density differential, where applicable).

TABLE 1

| Example | Ratio of $1^{st}/2^{nd}$ | First Component | Second Component | Melt Index, g/10 min. | Density g/cc | Density Differential (g/cc) | Vicat Softening Temp., °C. |
|---|---|---|---|---|---|---|---|
| 1 | 60/40 | A | F | 0.82 | 0.9085 | 0.022 | 88.3 |
| Comp. 2 | 60/40 | B | E | 0.94 | 0.9067 | 0.050 | 80.7 |
| 3 | 40/60 | A | G | 0.92 | 0.9075 | 0.014 | 87.1 |
| Comp. 4 | NA | NA | NA | 0.81 | 0.9059 | NA | 84.4 |

NA denotes not applicable.

Description of Test Methods

Densities and density differentials are measured in accordance with ASTM D-792 and are reported as grams/cubic centimeter (g/cc). The measurements reported in the Examples below as overall densities were determined after the polymer samples have been annealed for 24 hours at ambient conditions in accordance with ASTM D-792.

The density and weight percent of the first ethylene polymer component (A) for Example manufactured by in situ polymerization using two reactors can determined by an Analytical Temperature Rising Elution Fractionation (ATREF) technique. The hardware and procedures used for the ATREF technique have been previously described, e.g., Wild et al, *Journal of Polymer Science*, Poly. Phys. Ed., 20, 41(1982), Hazlitt, et al., U.S. Pat. No. 4,798,081 and Chum et al., U.S. Pat. No. 5,089,321, the disclosures of which are incorporated herein by reference. However, for the Examples provided herein, polymer mixtures were all manufactured by melt extrusion on a twin screw extruder.

Melt index measurements for the overall compositions and single component examples was performed according to ASTM D-1238, Condition 190° C./2.16 kilogram (kg). Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg, which is known as $I_{10}$.

The term "melt flow ratio" as defined herein in the conventional sense as the ratio of a higher weight melt index determination to a lower weight melt index determination. For measured $I_{10}$ and $I_2$ melt index values, the melt flow ratio is conveniently designated as $I_{10}/I_2$.

Vicat softening temperatures were measured in accordance with ASTM D1525 and secant moduli were measured Component Resin A was XU-59220.04, an experimental substantially linear ethylene/1-octene copolymer having an $I_2$ melt index of about 0.88 g/10 minutes and a density of about 0.898 g/cc as supplied by The Dow Chemical Company. Component Resin B was AFFINITY™ CL 8003, a substantially linear ethylene/1-octene copolymer having an $I_2$ melt index of about 1 g/10 minutes and a density of about 0.885 g/cc as supplied by The Dow Chemical Company. Component Resin F was DOWLEX™ 2045, a linear low density ethylene/1-octene copolymer having an $I_2$ melt index of about 1.0 g/10 minutes and a density of about 0.920 g/cc as supplied by The Dow Chemical Company. Component Resin E was DOWLEX™ 2038.68, a linear low density ethylene/l-octene copolymer having an $I_2$ melt index of about 1.0 g/10 minutes and a density of about 0.935 g/cc as supplied by The Dow Chemical Company. Component Resin G was ATTANE™ 4201, an ultra low density ethylene/ 1-octene copolymer having an $I_2$ melt index of about 1.0 g/10 minutes and a density of about 0.912 g/cc as supplied by The Dow Chemical Company.

Melting characterization of water quenched films of each resin was done using a Perkin-Elmer DSC-7. The DSC was calibrated using indium and water as standards. The water-quenched films were put in an aluminum pan and the samples were heated from –30° C. to 140° C. at 10° C./minute. The total heat of fusion for each resins was obtained from the area under the curve. The residual crystallinities at various temperatures were obtained using the partial area method by dropping a perpendicular at those temperatures wherein total crystallinity was taken by dividing the heat of fusion by 292 Joules/gram.

The resins were extruded into 30-mil cast sheets and quick quenched using a chilled roll. The melt temperature at the die was about 480° F. (249° C.) for each resin and the chill roll temperature was about 75° F. (24° C.). The cast sheets were oriented at their respective lowest orientation temperature using a T. M. Long Biaxial stretcher (a tenter framer stretcher). The initial dimensions of the cast sheets was 2 inches×2 inches and the draw ratio for the stretcher was set at 4.5×4.5 and the stretching rate was 5 inches per second (12.7 cm/s). The cast sheets were pre-heated in the stretcher for about 4 minutes prior to stretching and hot air was deflected so as not to impinge on the cast sheets directly (i.e., to avoid hot spots in the cast sheets).

In this evaluation, the lowest orientation temperature was taken as the temperature that gave a percent residual crystallinity of about 20 percent which was approximately 5° C. above the temperature where the cast sheet would tear, show "banding" (i.e., uneven deformation) or would repeatedly dislodged itself from the grips of the stretcher during stretching at a grip pressure of about 500 psi. The orientation window was taken as the temperature range from the lowest orientation temperature to the highest DSC peak melting temperature of the sample.

The oriented cast sheets were tested for unrestrained (free) shrink at 90° C. by measuring unrestrained shrink in a water-bath at 90° C. The samples were cut 12 cm×1.27 cm. The samples were marked with a marker exactly 10 cm. from one end for identification. Each sample was completely immersed in the water bath for five seconds and then quickly removed. Film shrinkage was obtained from the calculations in accordance with ASTM D-2732-83 and were taken from the average of four samples.

Table 2 summarizes the secant modulus, shrink response and orientation temperature for Examples 1 and 3 and comparative examples 2 and 4:

TABLE 2

| Example | 2% Secant Modulus | Percent Shrink @ 90° C. (hot H$_2$O) | Orientation Temp C. | Weight % Crystallinity @ Orientation Temp | Orientation Window ° C. |
|---|---|---|---|---|---|
| 1 | 17,023 | 34.5 | 87.8 | 20.8 | 33 |
| Comp. 2 | 17,218 | 25.0 | 93.3 | 19.6 | 29 |
| 3 | 15,327 | 30.8 | 87.8 | 21.0 | 34 |
| Comp. 4 | 12,832 | 26.0 | 90.6 | 19.9 | 30 |

The data in Table 2 indicate that Examples 1 and 3 are optimized shrink films relative to comparative examples 2 and 4. Examples 1 and 3 exhibited the highest shrink responses and broadest orientation windows. Inventive Example 3 exhibited a shrink response at least 18 percent higher than the single component heterogeneously branched linear ethylene polymer and Inventive Example 1 exhibited a shrink response at least 32 percent higher than the single component heterogeneously branched linear ethylene polymer. Additionally, Table 1 above indicates that Examples 1 and 3 also exhibited the highest softening temperature relative to comparative examples 2 and 4.

Examples 5 and 7 and Comparative Examples 6, 8 and 9

In another evaluation, another single component ethylene polymer and four different ethylene polymer blends were evaluated to discover the requirements for improved shrink properties at higher polymer densities. Table 3 lists the various polymers evaluated and their properties (i.e., melt index, density, Vicat softening point and description of first and second polymer components and their density differential, where applicable).

TABLE 3

| Example | Ratio of 1$^{st}$/2$^{nd}$ | First Component | Second Component | Melt Index, g/10 min. | Density g/cc | Density Differential (g/cc) | Vicat Softening Temp., ° C. |
|---|---|---|---|---|---|---|---|
| 5 | 40/60 | D | F | 1.0 | 0.914 | 0.018 | 96 |
| Comp. 6 | 60/40 | C | E | 1.28 | 0.9133 | 0.0385 | 91.5 |
| 7 | 30/70 | A | F | 0.86 | 0.9146 | 0.022 | 96 |
| Comp. 8 | 60/40 | A | E | 0.85 | 0.9141 | 0.037 | 94 |
| Comp. 9 | NA | NA | NA | 0.92 | 0.9128 | NA | 95.8 |

NA denotes not applicable.

Component Resin A was XU-59220.04, an experimental substantially linear ethylene/1-octene copolymer having an I$_2$ melt index of about 0.88 g/10 minutes and a density of about 0.898 g/cc as supplied by The Dow Chemical Company. Component Resin C was AFFINITY™ PF 1140, a substantially linear ethylene/1-octene copolymer having an I$_2$ melt index of about 1.6 g/10 minutes and a density of about 0.8965 g/cc as supplied by The Dow Chemical Company. Component Resin D was AFFINITY™ PL 1880, a substantially linear ethylene/1-octene copolymer having an I$_2$ melt index of about 1.0 g/10 minutes and a density of about 0.902 g/cc as supplied by The Dow Chemical Company. Component Resin E was DOWLEX™ 2038.68, a linear low density ethylene/1-octene copolymer having an I$_2$ melt index of about 1.0 g/10 minutes and a density of about 0.935 g/cc as supplied by The Dow Chemical Company. Component Resin F was DOWLEX™ 2045A, a linear low density ethylene/1-octene copolymer having an I$_2$ melt index of about 1.0 g/10 minutes and a density of about 0.920 g/cc as supplied by The Dow Chemical Company.

The test methods and procedures used for Examples 5 and 7 and comparative examples 6, 8 and 9 were the same for Examples 1, except instead of a water-bath to induce shrinkage, hot oil at 105° C. was used and the orientation temperature was taken at approximately 21% residual crystallinity rather than at approximately 20%. Table 4 summarizes the various results.

TABLE 4

| Example | 2% Secant Modulus | Percent Shrink @ 105° C. (hot H$_2$O) | Orientation Temp C. | Weight % Crystallinity @ Orientation Temp | Orientation Window ° C. |
|---|---|---|---|---|---|
| 5 | 21,683 | 44.5 | 96.1 | 20.6 | 25 |
| Comp. 6 | 21,593 | 35.8 | 97.8 | 21.8 | 23 |
| 7 | 23,692 | 41.3 | 96.1 | 22.5 | 25 |
| Comp. 8 | 24,204 | 37.8 | 98.3 | 21.9 | 23 |
| Comp. 9 | 18,770 | 38.5 | 98.3 | 21.0 | 23 |

The data in Table 4 indicate that Examples 5 and 7 are optimized shrink films relative to comparative examples 6, 8 and 9. Examples 5 and 7 exhibited the highest shrink responses and equivalent to broader orientation windows. Further, Table 3 above indicates that Examples 5 and 7 also exhibited the highest softening temperature relative to comparative polymer blends, comparative examples 6 and 8.

We claim:

1. A multilayer shrink film having a shrink control layer, the shrink control layer comprising a polymer mixture wherein the polymer mixture has a density in the range of about 0.88 gram/centimeter (g/cc) to about 0.94 g/cc as determined in accordance with ASTM D-792 and includes (A) from about 20 to about 80 weight percent, based on the total weight of the polymer mixture, of at least one first ethylene polymer which is a substantially linear ethylene/α-olefin interpolymer containing at least one C$_3$–C$_{20}$ α-olefin, having from about 0.01 to 3 long chain branches per 1000 carbons and characterized as having:

i. a short chain branching distribution index (SCBDI) greater than 50 percent,
   ii. a single melting peak between −30° and 150° C. as determined using differential scanning calorimetry (DSC),
   iii. a melt flow ratio, I$_{10}$/I$_2$, equal to or greater than 5.63,
   iv. a molecular weight distribution, M$_w$/M$_n$, defined by the equation:

$$M_w/M_n \leq (I_{10}/I_2) - 4.63, \text{ and}$$

v. a gas extrusion rheology critical shear rate wherein the critical shear rate at the onset of surface melt fracture for the substantially linear ethylene/α-olefin polymer is at least 50 percent greater than the critical shear rate at the onset of surface melt fracture for a linear ethylene/α-olefin polymer containing at least one C$_3$–C$_{20}$ α-olefin, wherein the linear ethylene/α-olefin polymer is characterized as having an I$_2$, and M$_w$/M$_n$ within ten percent of the substantially linear ethylene/α-olefin polymer, and wherein the critical shear rates of the substantially linear ethylene/α-olefin polymer and the linear ethylene/α-olefin polymer are measured at the same melt temperature using a gas extrusion rheometer, and
   vi. a density in the range of about 0.87 (g/cc) to about 0.93 g/cc as determined in accordance with ASTM D-792, and (B) from about 20 to about 80 weight percent, based on the total weight of the polymer mixture, of at least one second ethylene polymer which is a heterogeneously branched ethylene/α-olefin ethylene interpolymer containing at least one C$_3$–C$_{20}$ α-olefin characterized as having one or more melting peaks as determined using differential scanning calorimetry (DSC) and a density in the range of about 0.89 (g/cc) to about 0.96 g/cc as determined in accordance with ASTM D-79, wherein the density differential between the first and second ethylene polymer components, determined in accordance with ASTM D-792, is in the range of from about 0 to about 0.025 g/cc and the density of the first ethylene polymer is equal to or lower than the density of the second ethylene polymer.

2. The shrink film of claim 1 wherein the multilayer film structure is prepared by a coextrusion technique.

3. The shrink film of claim 1 wherein the multilayer film structure is prepared by a lamination technique.

4. The shrink film of claim 1, wherein the multilayer film structure includes a sealant layer comprising at least one homogeneously branched ethylene/α-olefin interpolymer.

5. The multilayer shrink film of claim 1, wherein the at least one first ethylene polymer is a copolymer of ethylene and 1-octene.

6. The multilayer shrink film of claim 1, wherein the density differential is in the range of from about 0.015 to about 0.025 g/cc.

7. The multilayer shrink film of claim 1, wherein the at least one first ethylene polymer component (A) and the at least one second ethylene polymer component (B) are further characterized as having a DSC crystallinity in weight percent where the DSC crystallinity differential between the at least one first ethylene polymer component (A) and the at least one second ethylene polymer component (B) is from about 7 to about 21%.

8. The multilayer shrink film of claim 1, wherein the film is a biaxially oriented shrink film having free shrinkage in the machine and transverse directions.

* * * * *